(No Model.)  2 Sheets—Sheet 1.

L. C. FARMER
WEIGHING SCALES.

No. 399,860.  Patented Mar. 19, 1889.

Witnesses
J. Jessen
C. L. Nachtrieb

Inventor
Luther C. Farmer
By Paul, Sanford & Merwin  Att'ys (No Model.) 2 Sheets—Sheet 2.

L. C. FARMER.
WEIGHING SCALES.

No. 399,860. Patented Mar. 19, 1889.

Witnesses
J. Jessen.
C. L. Nachtrieb.

Inventor
Luther C. Farmer.
By Paul, Sanford & Merwin
Attys.

UNITED STATES PATENT OFFICE.

LUTHER C. FARMER, OF MINNEAPOLIS, MINNESOTA.

WEIGHING-SCALE.

SPECIFICATION forming part of Letters Patent No. 399,860, dated March 19, 1889.

Application filed August 14, 1888. Serial No. 282,701. (No model.)

*To all whom it may concern:*

Be it known that I, LUTHER C. FARMER, of Minneapolis, in the county of Hennepin and State of Minnesota, have invented certain new and useful Improvements in Weighing-Scales, of which the following is a specification.

My invention relates, generally, to improvements in platform or counter scales, though applicable to scales of any kind; and it consists, generally, in the construction and arrangement hereinafter described, and particularly pointed out in the claim.

Figure 1:
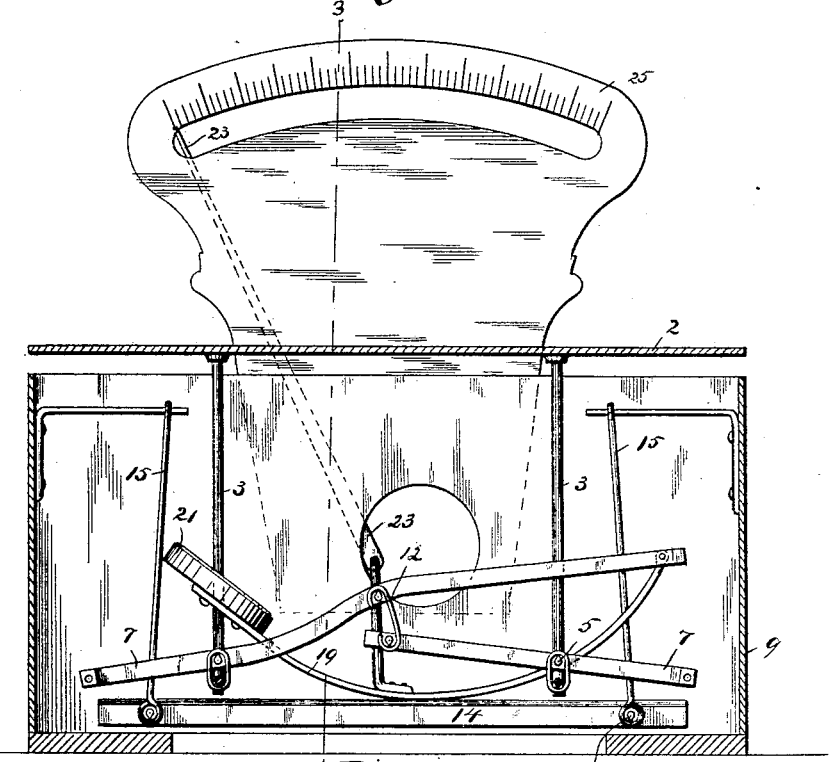
Figure 2:
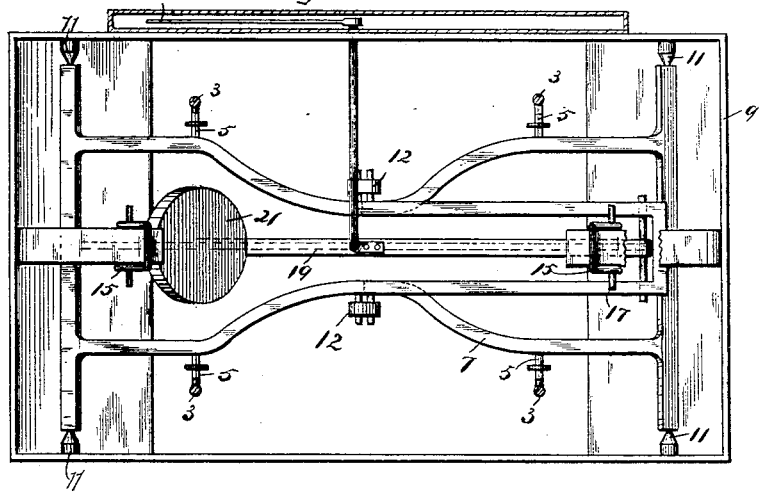
Figure 3:
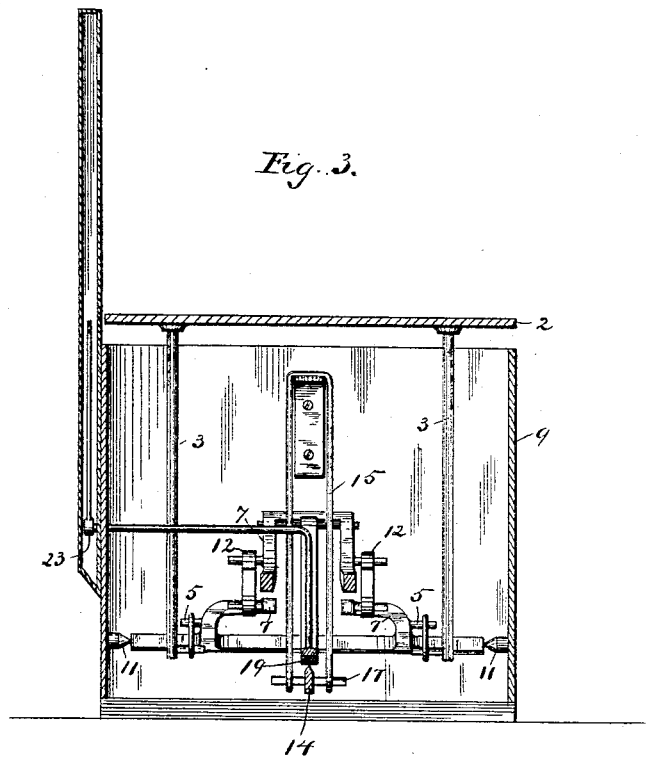

In the drawings, which form a part of this specification, Figure 1 is a longitudinal vertical section through a scale embodying my improvement. Fig. 2 is a plan view of the same, with the platform on which the load is carried removed. Fig. 3 is a vertical cross-section on line 3 3 of Fig. 1.

In the drawings, 2 represents the platform of the scale, which is preferably provided with the standards 3, which are connected by suitable knife-edge joints or fulcrums 5 to the pivoted levers 7 at each side of the device. The pivoted levers 7 are preferably suspended from or pivoted to a suitable frame, 9, at the four corners of the scale, and upon suitable anti-friction pivots, 11, in order to avoid all friction possible. A link or connecting-rod, 12, secures the two levers 7 together at or near the center of the scale. The pins or connections between the levers and the rod 12 are preferably furnished with knife-edges to lessen the friction.

A bar, 14, is preferably suspended below the levers 7, and is connected to the frame or case of the scale by the links 15 at either end and supported by means of the knife-edge fulcrum-pins 17. The bar 14 is preferably provided at its top with a knife-edge, which prevents accumulation of dust thereon.

A curved bar, 19, is preferably arranged to travel upon the bar 14, and to one end of this bar 19 is preferably pivoted the projecting end of one of the levers 7. The opposite end of the curved bar 19 is preferably provided with a weight, 21.

As the levers 7 are depressed, the curved bar 19 travels on the edge of the bar 14, and the point of contact between the curved and the straight bars will be shifted toward the point of connection between the said bar 19 and the levers 7. This will give an increase in the amount of leverage as the bar is depressed. The weight 21 upon the opposite end of the curved bar 19 tends to balance the operating parts of the scale and also to act as a counter-weight for the load to be weighed; for it will be seen that as the load is increased the relative position of this weight is changed, so that the leverage produced or exerted by this weight will act through the operating mechanism of the scale and sustain the load at a certain point, and the point at which this is suspended when properly adjusted will indicate the weight, and when properly graduated will indicate the number of pounds contained in the load.

A suitable index-pointer, 23, may be secured at some point upon the curved bar 19, and a graduated dial or segment, 25, may be suitably secured to the scale, so as to be traversed by the pointer 23, in order to indicate the weight denoted by the scale.

The operation of the device is as follows: The articles to be weighed are placed upon the platform 2, and the weight of these articles depresses the said platform to a certain degree. The standards bearing upon the pivoted levers 7 will be forced downward, carrying with them the said levers, causing them to be partially revolved about the pivot 11. The end of the lever 7, which is attached to the curved bar 19, will carry this end of the said bar 19 downward, causing the bar 19 to traverse a certain portion of the bar 14, carrying upward the weighted end of the said curved bar and increasing its leverage until a point is reached where the said weight 21 counterbalances the load upon the scale-platform. It may be found necessary in construction to form the bar 19 of an irregular curve, in order to secure the best result for the counterbalancing-weight. As the curved bar 19 traverses the bar 14, the suspension-links 15 allow the bar 14 to move or swing from side to side, so that the surfaces of the bars will travel upon each other without slipping. This allows an easy movement between the bars and a sensitive adjustment of the scale.

It will be seen that the load to be weighed is supported upon the curved bar at one side of its bearing, and the weight or counterpoise is supported upon this bar at the opposite side of its bearings. I do not wish to be limited to any particular arrangement of platform or levers for connecting the platform with the curved bar, as any suitable means may be employed for supporting the load upon the bar at the side of its bearing opposite the counterpoise, and I may also make use of any suitable indicating device.

I claim as my invention—

The combination, in a scale, with the bar 14, of the links 15, supporting said bar, the curved bar 19, mounted upon said bar 14 and adapted to turn freely thereon, the weight 21, secured to said bar 19 at one side of its bearing, the lever 7, connected with said bar at the opposite side of its bearing, the scale-platform supported upon said levers, the indicating-scale, and the pointer secured upon said curved bar, substantially as described.

In testimony whereof I have hereunto set my hand this 10th day of August, 1888.

LUTHER C. FARMER.

In presence of—
R. H. SANFORD,
C. L. NACHTRIEB.